(12) United States Patent
Uwano (10) Patent No.: US 11,487,275 B2
(45) Date of Patent: Nov. 1, 2022

(54) ANALYZER

(71) Applicant: Fanuc Corporation, Yamanashi (JP)

(72) Inventor: Tomofumi Uwano, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 99 days.

(21) Appl. No.: 17/070,043

(22) Filed: Oct. 14, 2020

(65) Prior Publication Data

US 2021/0141369 A1 May 13, 2021

(30) Foreign Application Priority Data

Nov. 7, 2019 (JP) .............................. JP2019-202079

(51) Int. Cl.
*G05B 23/02* (2006.01)

(52) U.S. Cl.
CPC ....... *G05B 23/0221* (2013.01); *G05B 23/024* (2013.01); *G05B 23/0256* (2013.01)

(58) Field of Classification Search
CPC .............. G05B 23/0221; G05B 23/024; G05B 23/0256
See application file for complete search history.

(56) References Cited

U.S. PATENT DOCUMENTS

2016/0217133 A1* 7/2016 Reiter .................... G06F 40/56
2021/0014144 A1* 1/2021 Iwai .................... H04L 41/5067

FOREIGN PATENT DOCUMENTS

JP          2019012473 A    1/2019
JP          2019144931 A    8/2019

\* cited by examiner

*Primary Examiner* — Manuel L Barbee
(74) *Attorney, Agent, or Firm* — RatnerPrestia (57) ABSTRACT

An analyzer includes a preliminary analysis unit that extracts interval data obtained by cutting out time-series data with a predetermined sliding window width, and analyzes simplicity of a change trend of the extracted interval, a data division unit that divides the data into pieces of division data with a sliding window width set based on an analysis result performed by the preliminary analysis unit, a data generation unit that generates combination data which is a text indicating a change trend in the division data based on the division data, and a data analysis unit that analyzes the combination data.

6 Claims, 7 Drawing Sheets

ANALYZER

RELATED APPLICATIONS

The present application claims priority to Japanese Patent Application Number 2019-202079 filed Nov. 7, 2019, the disclosure of which is hereby incorporated by reference herein in its entirety.

BACKGROUND OF THE INVENTION

1. Field of the Invention

The present invention relates to an analyzer.

2. Description of the Related Art

A device that monitors an operation state of an industrial machine such as a robot or a machine tool installed on a manufacturing line, and manages the operation state of the industrial machine has been introduced at a manufacturing site such as a factory.

The device that manages the operation state of the industrial machine monitors, for example, time-series data such as a position, a speed, or a torque of a motor detected in each industrial machine via a network, data indicating a change in a signal at a predetermined time, and time-series data such as vibration, sound, or a moving image detected by a sensor attached to the industrial machine. The device that manages the operation state of the industrial machine detects a trend indicating an abnormality from a change state of each data with a time shift (for example, JP 2019-144931 A, JP 2019-012473 A).

The operation state of the industrial machine may need to be determined based on a relationship between pieces of data rather than based on predetermined single data. For example, the operation state may be determined by analyzing the relationship between the pieces of data such as whether or not two drive systems provided in the industrial machine are moving up or down at the same timing or do not have any relation, or whether or not a predetermined signal is turned on or off when a certain part is in a specific state. In this case, it is necessary to grasp the relationship between the pieces of data in advance and then create an algorithm or a condition for the determination.

When the number of pieces of data acquired from the industrial machine is small or when a data acquisition period is relatively short, the pieces of data are displayed on a graph on the same time scale, and thus, an operator can visually grasp the relationship between the pieces of data while seeing the display. However, when the number of pieces of data acquired from the industrial machine is large or when the data acquisition period is relatively long, it is difficult for a person to determine the relationship between the pieces of data.

Thus, a method of analyzing the relationship between the pieces of data is needed. In general, a degree of similarity between pieces of time-series numerical data can be calculated by Euclidean distance, cross-correlation function (CCF), dynamic time warping (DTW), or the like. However, even if these methods are used, it is difficult to simultaneously grasp a relationship between a plurality of pieces of data in each part by paying attention to a characteristic part of the data acquired over a long period.

Thus, there is a demand for a mechanism that can easily analyze a relationship between a plurality of pieces of time-series data.

SUMMARY OF THE INVENTION

The present invention solves the above-mentioned problems by enabling application of a technology of association analysis which is a known data analysis method of grasping of a relationship between a plurality of pieces of data including time-series data. In general, the association analysis cannot be applied to the time-series data, but an analyzer according to an aspect of the present invention can apply the association analysis by finding and extracting an interval having a characteristic relationship between pieces of time-series data from these pieces of acquirable time-series data.

An aspect of the present invention is an analyzer that analyzes data including time-series data acquired from an industrial machine. The analyzer includes a preliminary analysis unit configured to extract interval data obtained by cutting out the time-series data included in the data with a predetermined sliding window width, and analyze simplicity of a change trend of the extracted interval data, a data division unit configured to divide the data into pieces of division data with a sliding window width set based on an analysis result performed by the preliminary analysis unit, a data generation unit configured to generate combination data which is a text indicating a change trend in the division data based on the division data, and a data analysis unit configured to analyze the combination data.

Another aspect of the present invention is an analysis method of analyzing data including time-series data acquired from an industrial machine. The analysis method includes a first step of extracting interval data obtained by cutting out the time-series data included in the data with a predetermined sliding window width, and analyzing simplicity of a change trend of the extracted interval data, a second step of setting a sliding window width based on an analysis result in the first step, and dividing the data into pieces of division data with a sliding window width set, a third step of generating combination data which is a text indicating a change trend in the division data based on the division data, and a fourth step of analyzing the combination data.

According to the aspect of the present invention, a relationship between a plurality of pieces of data including time-series data can be grasped, and data can be more easily utilized.

BRIEF DESCRIPTION OF THE DRAWINGS

Objects and features of the present invention will become apparent from the following description of embodiments with reference to the accompanying drawings. Of those drawings.

DETAILED DESCRIPTION OF THE PREFERRED EMBODIMENTS

Hereinafter, embodiments of the present invention will be described with reference to the drawings.

Figure 1:
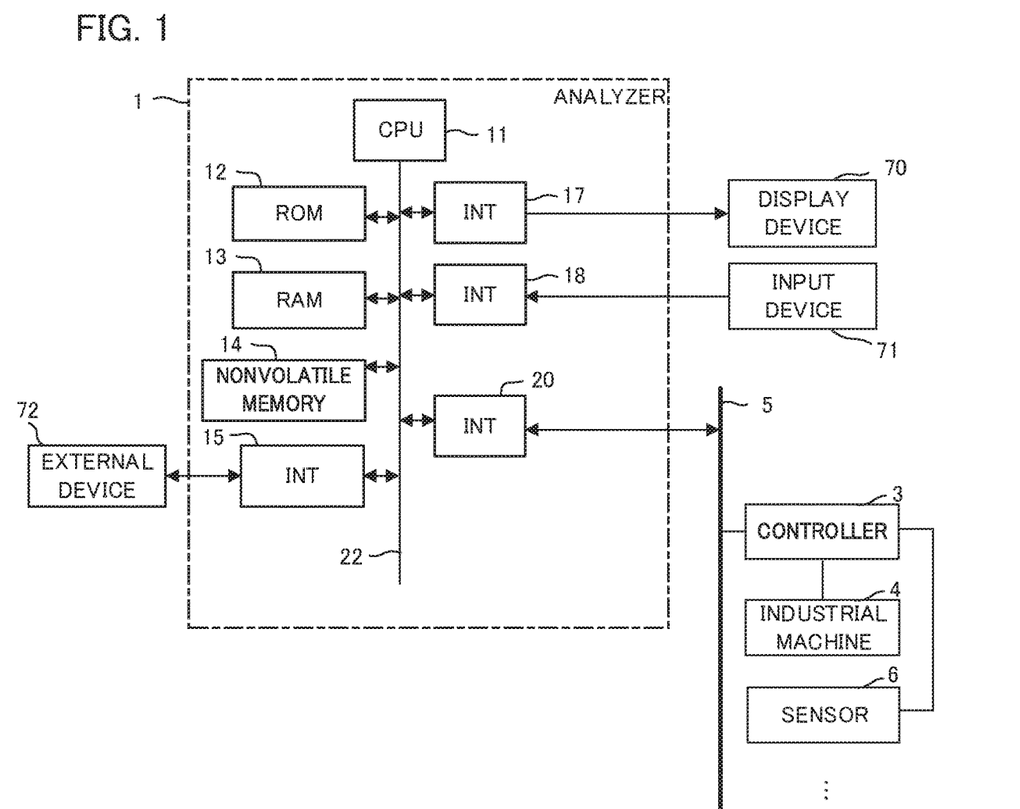
FIG. 1 is a schematic hardware configuration diagram of an analyzer according to an embodiment.

FIG. 1 is a schematic hardware configuration diagram illustrating an analyzer according to an embodiment of the present invention. An analyzer 1 may be implemented in, for example, a controller that controls an industrial machine. The analyzer 1 may be implemented in a personal computer installed with the controller that controls the industrial machine, or a personal computer, a cell computer, a fog computer, or a cloud server connected to the controller via a wired or wireless network. In the present embodiment, an example in which the analyzer 1 is implemented in a personal computer connected to the controller that controls the industrial machine via the network is described.

A central processing unit (CPU) 11 included in the analyzer 1 according to the present embodiment is a processor that controls the analyzer 1 as a whole. The CPU 11 reads a system program stored in a read only memory (ROM) 12 via a bus 22. The CPU 11 controls the entire analyzer 1 according to the system program. A random access memory (RAM) 13 temporarily stores calculation data, display data, various kinds of data input from the outside, and the like.

A nonvolatile memory 14 is, for example, a memory backed up by a battery (not illustrated), a solid state drive (SSD), or the like. The nonvolatile memory 14 maintains a storage state even if a power of the analyzer 1 is turned off. Data read from an external device 72 via an interface 15, data input via an input device 71, data acquired from a controller 3 via an interface 20, and the like are stored in the nonvolatile memory 14. The data stored in the nonvolatile memory 14 may be loaded in the RAM 13 in the case of being executed or used. Various system programs such as a known analysis program are written in the ROM 12 in advance.

The interface 15 is an interface for connecting the CPU 11 of the analyzer 1 to the external device 72 such as a Universal Serial Bus (USB) device. For example, data or the like acquired by another industrial machine may be read from the external device 72 side. The data or the like processed in the analyzer 1 may be stored in an external storage unit via the external device 72.

The interface 20 is an interface for connecting the CPU 11 of the analyzer 1 to a wired or wireless network 5. The controller 3, the fog computer, the cloud server, and the like are connected to the network 5, and exchange data with the analyzer 1.

The data read on the memory, the data obtained as a result obtained by executing the program, and the like are output to a display device 70 via an interface 17 and displayed thereon. The input device 71 including a keyboard, and a pointing device delivers commands, data, and the like based on an operation of an operator to the CPU 11 via an interface 18.

Figure 2:
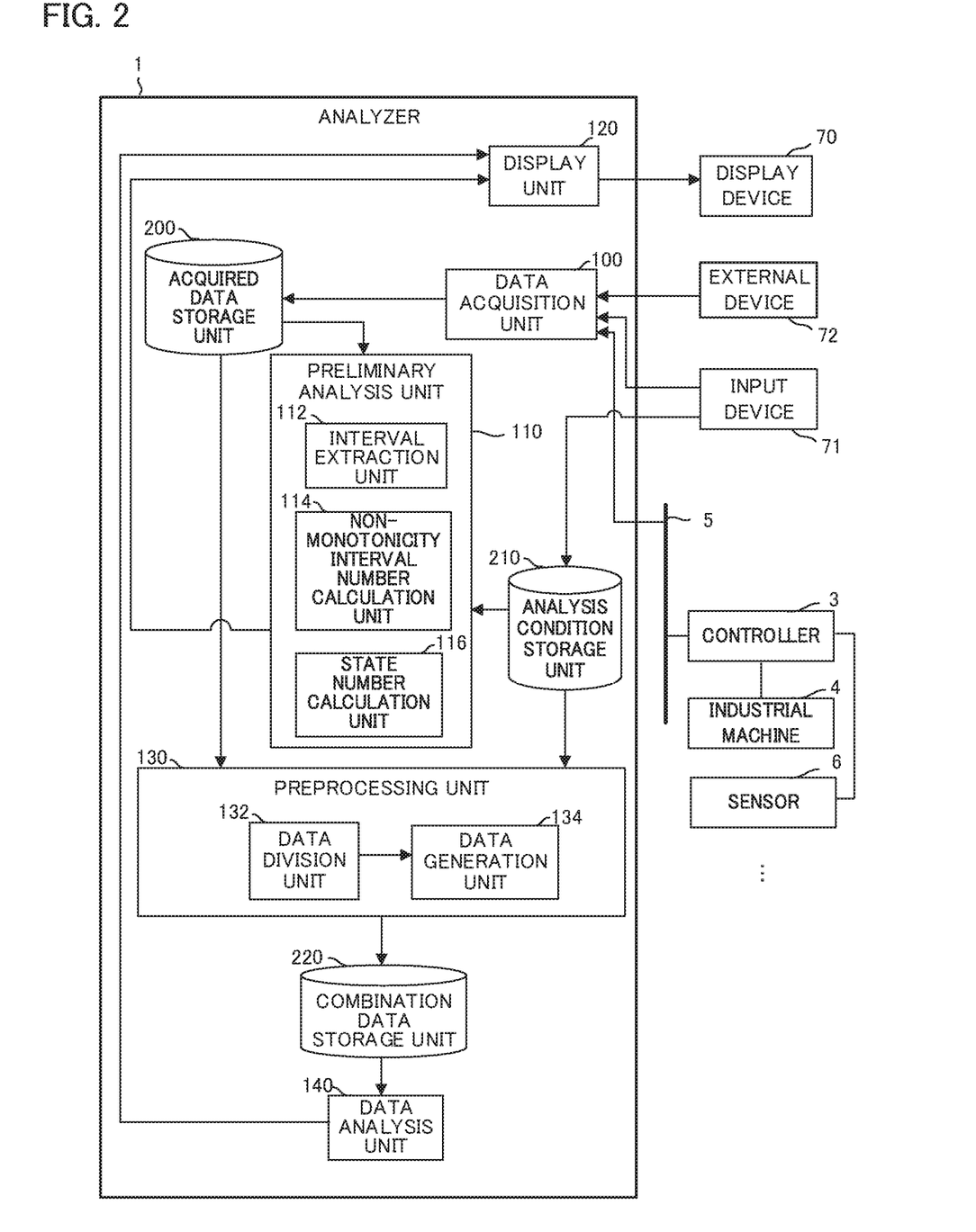
FIG. 2 is a schematic functional block diagram of an analyzer according to a first embodiment.

FIG. 2 is a schematic block diagram illustrating functions of the analyzer 1 according to a first embodiment. The functions of the analyzer 1 according to the present embodiment are realized by the CPU 11 of the analyzer 1 illustrated in FIG. 1 executing the system program and controlling operations of the units of the analyzer 1.

The analyzer 1 includes a data acquisition unit 100, a preliminary analysis unit 110, a display unit 120, a preprocessing unit 130, and a data analysis unit 140. In the RAM 13 or the nonvolatile memory 14 of the analyzer 1, an acquired data storage unit 200 is prepared in advance as a region for storing the data acquired from the input device 71, the external device 72, the controller 3, or the like. In the RAM 13 or the nonvolatile memory 14, an analysis condition storage unit 210 as a region for storing analysis conditions of data and a combination data storage unit 220 as a region for storing a result obtained by preprocessing data are prepared in advance.

The data acquisition unit 100 is realized by the CPU 11 executing the system program read from the ROM 12 and by the CPU 11 mainly performing arithmetic processing using the RAM 13 and the nonvolatile memory 14 and input control processing using the interface 15, 18 or 20. The data acquisition unit 100 acquires time-series data detected in operation of an industrial machine 4, data indicating a change of a signal at a predetermined time, and the like. The data indicating the change of the signal at the predetermined time may be handled as the time-series data by representing the change of the signal on a time axis. The data acquisition unit 100 acquires position data, speed data, acceleration data, and torque data of a motor of the industrial machine 4. The data acquisition unit 100 acquires vibration data, sound data, and image data detected by a sensor 6 attached to the industrial machine 4. The data acquisition unit 100 acquires various kinds of data and the like stored in the controller 3 that controls the industrial machine 4. The data acquisition unit 100 may directly acquire data related to the industrial machine 4 from the controller 3 via the network 5. The data acquisition unit 100 may acquire data already acquired by and stored in the external device 72, the fog computer, the cloud server (not illustrated), or the like. The data acquired by the data acquisition unit 100 is stored in the acquired data storage unit 200.

The preliminary analysis unit 110 is realized by the CPU 11 executing the system program read from the ROM 12 and by the CPU 11 mainly performing the arithmetic processing using the RAM 13 and the nonvolatile memory 14. The preliminary analysis unit 110 performs preliminary analysis on the data stored in the acquired data storage unit 200. The preliminary analysis unit 110 outputs the analysis result to the display unit 120. The preliminary analysis is performed in order to demonstrate to the operator a method of defining an interval of the data stored in the acquired data storage unit 200 such that interval data indicating a simple change trend can be extracted. That is, the preliminary analysis is performed in order to analyze, in advance, the simplicity of the change trend of the interval data when the data is divided into predetermined intervals. The preliminary analysis unit 110 includes an interval extraction unit 112, a non-monotonicity interval number calculation unit 114, and a state number calculation unit 116.

Figure 3:
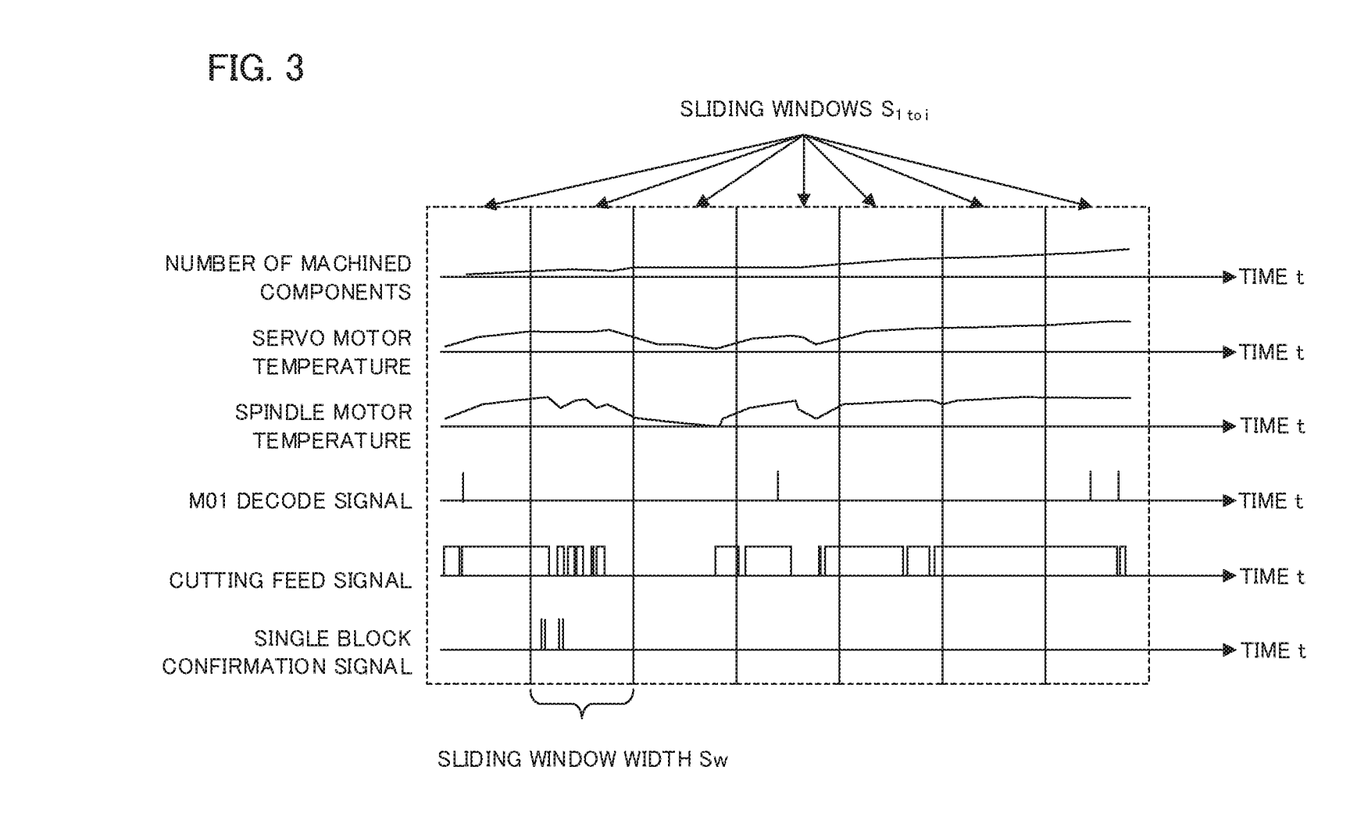
FIG. 3 is a diagram illustrating an example of data stored in an acquired data storage unit.

The interval extraction unit 112 extracts interval data obtained by cutting out the data stored in the acquired data storage unit 200 by sliding windows S1 to Si each having a sliding window width Sw based on a value of the sliding window width Sw stored in the analysis condition storage unit 210. The interval extraction unit 112 arranges a left end of the sliding window S1 at a position of time t=0. The interval extraction unit 112 arranges the sliding windows such that a left end of the succeeding sliding window is at a position of a right end of the preceding sliding window. The interval extraction unit 112 extracts the interval data by cutting out the time-series data by sliding windows. The sliding window width Sw may be set as the analysis condition by the operator operating the input device 71. FIG. 3 illustrates an example of the data stored in the acquired data storage unit 200. In the example of FIG. 3, data acquired when machined components are machined by a machine tool as the industrial machine 4 is illustrated. For example, it is assumed that the acquired data storage unit stores time-series data such as the number of machined components machined by the machine tool, a servo motor temperature and a spindle motor temperature of the machine tool. It is assumed that a signal state of an M01 decode signal, a signal state of a cutting feed signal, and a signal state of a single block confirmation signal are stored as signal states of the machine tool in the acquired data storage unit. At this time, the interval extraction unit 112 arranges these pieces of data on the time axis, and extracts, as the interval data, data in each sliding window when the time axis is divided according to the preset sliding window width Sw. A relationship between the data and the sliding window width Sw illustrated in FIG. 3 may be displayed on the display device 70 by the display unit 120. By doing so, the operator can adjust the sliding window width Sw while confirming the relationship between each data and the sliding window width Sw on a screen. Although the interval data is cut out such that a time at the left end of the sliding window S1 becomes zero, this position may be adjustable. In this case, the amount of adjusted position ew is also stored in the analysis condition storage unit 210 together with the sliding window width Sw.

Figure 4:
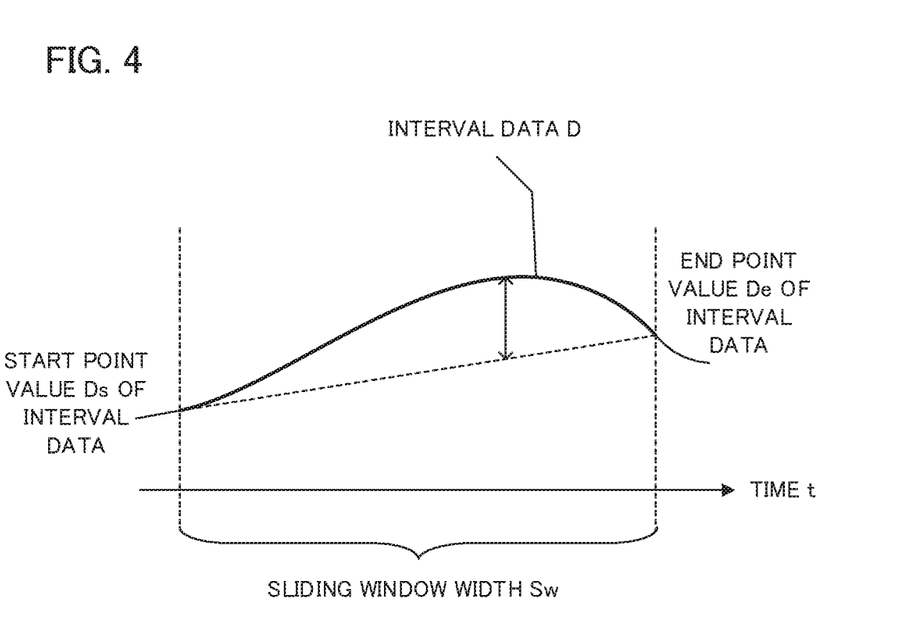
FIG. 4 is a diagram for describing determination of monotonicity.

The non-monotonicity interval number calculation unit 114 obtains, for the interval data which is numerical data among the pieces of interval data extracted by the interval extraction unit 112, the number of pieces of interval data in which a change in the numerical value indicates non-monotonicity (no monotonicity). The non-monotonicity interval number calculation unit 114 determines that the interval data which is the numerical data indicates non-monotonicity when the interval data does not indicate a trend of a monotonic increase or a monotonic decrease. The determination at this time may be allowed to have some margin. For example, as illustrated in FIG. 4, a straight line connecting a start point value Ds and an end point value De is obtained for certain interval data D. When there is a portion at which a difference between a value at each point in time of the interval data D and a value with which the straight line is obtained at each point in time exceeds a predetermined threshold value, the non-monotonicity interval number calculation unit 114 may determine that the interval data D indicates non-monotonicity. In a similar case, when there is a portion at which a ratio of the value at each point in time of the interval data D and the value with which the straight line is obtained at each point in time exceeds the predetermined threshold value, the non-monotonicity interval number calculation unit 114 may determine that the interval data D indicates non-monotonicity. When there are simultaneously an interval having a predetermined width (for example, a width of 30% of the interval data D) and a continuous positive slope equal to or larger than a predetermined positive threshold value and an interval having a continuous negative slope equal to or less than a negative threshold value within a certain interval data D, the non-monotonicity interval number calculation unit 114 may determine that the interval data D indicates non-monotonicity. When it is generally determined that the interval data indicates non-monotonicity according to characteristics of the data, the non-monotonicity interval number calculation unit 114 may determine that the interval data indicates non-monotonicity. The value obtained by the non-monotonicity interval number calculation unit 114 may be used as a scale for measuring the simplicity of the change trend of the interval data in the numerical data.

The state number calculation unit 116 calculates, for the interval data that is not the numerical data such as a signal among the pieces of interval data extracted by the interval extraction unit 112, the number of states of the data in each piece of interval data. The state number calculation unit 116 obtains the number of pieces of interval data for each calculated number of states. For example, when the interval data does not change with an ON or OFF value in the interval, the state number calculation unit 116 calculates the number of states of the interval data as 1. For example, when the interval data changes once from the value of ON to the value of OFF or from the value of OFF to the value of ON in the interval, the state number calculation unit 116 calculates the number of states of the interval data as 2. For example, when the interval data changes from the value of ON to the value of OFF in the interval and then changes from the value of OFF to the value of ON or when the interval data changes from the value of OFF to the value of ON and then changes from the value of ON to the value of OFF, that is, when the interval data changes twice, the state number calculation unit 116 calculates the number of states of the interval data as 3. The value calculated by the state number calculation unit 116 can be used as a scale for measuring the simplicity of the change trend of the interval data in data other than the numerical data.

The display unit 120 is realized by the CPU 11 executing the system program read from the ROM 12 and by the CPU 11 mainly performing the arithmetic processing using the RAM 13 and the nonvolatile memory 14 and output control processing using the interface 17. The display unit 120 displays a result of the preliminary analysis of the preliminary analysis unit 110 and a result of the data analysis of the data analysis unit 140 on the display device 70. The display unit 120 displays the relationship between the data and the sliding window width Sw illustrated in FIG. 3, for example. The display unit 120 displays, as the result of the preliminary analysis of the preliminary analysis unit 110 in the sliding window width Sw set by the operator, the number of pieces of interval data indicating non-monotonicity obtained by the non-monotonicity interval number calculation unit 114. The display unit 120 displays the number of pieces of interval data for each number of states obtained by the state number calculation unit 116.

Figure 5:
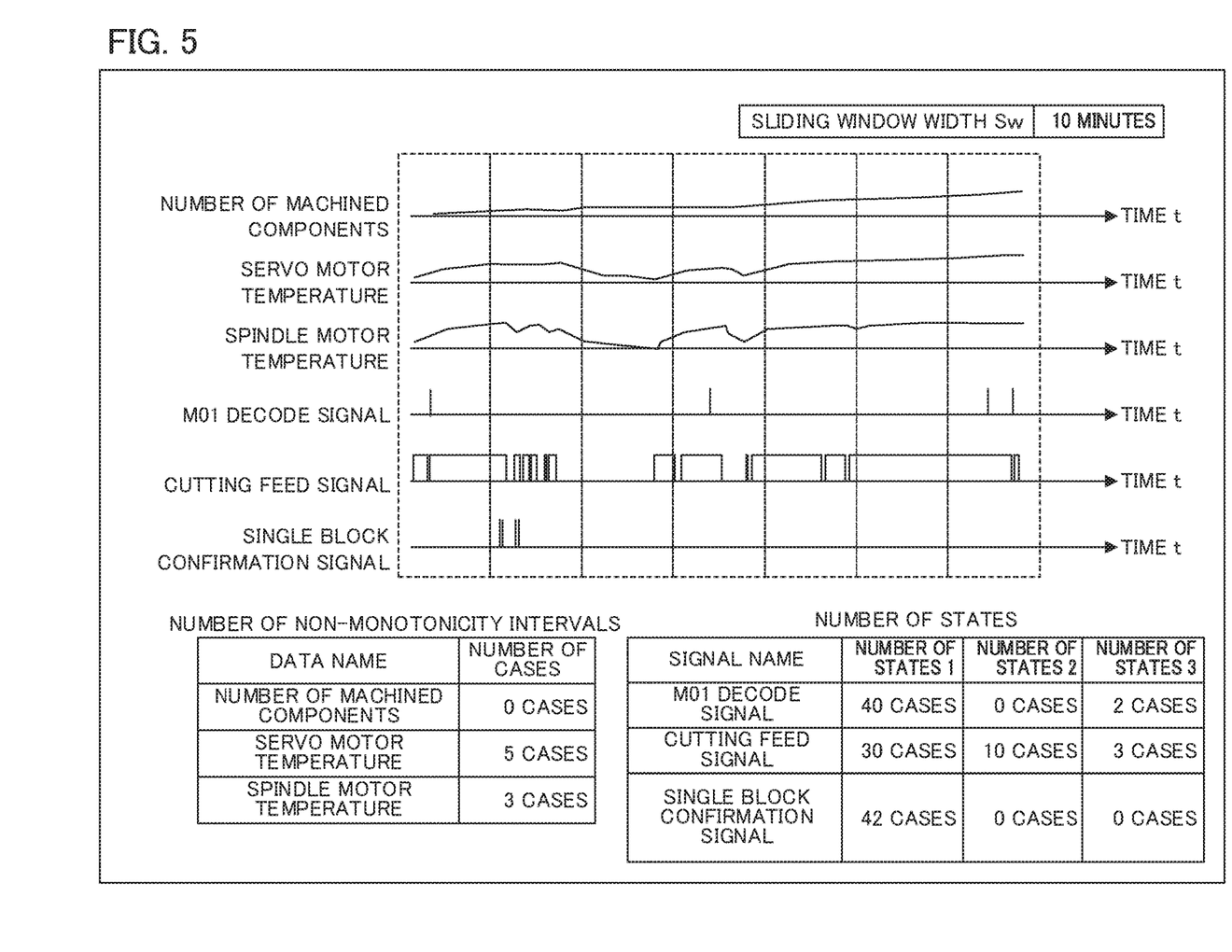
FIG. 5 is a diagram illustrating a display example of the number of non-monotonicity intervals and the number of states.

FIG. 5 illustrates an example of a display on the display unit 120. In the example of FIG. 5, the number of pieces of interval data indicating non-monotonicity obtained by the non-monotonicity interval number calculation unit 114 and the number of pieces of interval data for each number of states obtained by the state number calculation unit 116 are displayed together with the relationship between each data stored in the acquired data storage unit 200 and the sliding window width Sw. The operator can examine the validity of the set sliding window width Sw while seeing such a display. The operator can examine a value of the sliding window width Sw with less non-monotonicity intervals and less intervals at which the number of states is large while seeing the display illustrated in FIG. 5.

The preprocessing unit 130 is realized by the CPU 11 executing the system program read from the ROM 12 and by the CPU 11 mainly performing the arithmetic processing using the RAM 13 and the nonvolatile memory 14. The preprocessing unit 130 performs preprocessing on the data stored in the acquired data storage unit 200. The preprocessing unit 130 stores the combination data generated as a result of the preprocessing in the combination data storage unit 220. In the preprocessing executed by the preprocessing unit 130, the data stored in the acquired data storage unit 200 is divided according to the sliding window width Sw determined to be valid by the preliminary analysis, and the combination data is generated by converting into a predetermined text indicating the change trend of the divided division data. The preprocessing unit 130 includes a data division unit 132 and a data generation unit 134.

The data division unit 132 creates the division data by dividing the data stored in the acquired data storage unit 200 according to the sliding windows S1 to Si each having the sliding window width Sw based on the value of the sliding window width Sw stored in the analysis condition storage unit 210. The sliding window width Sw stored in the analysis condition storage unit 210 is the value determined to be valid by the operator by the preliminary analysis using the preliminary analysis unit 110. The sliding window width Sw used for creating the division data may be one value determined to be the most valid by the operator, or may be a plurality of values determined by the operator. The sliding window is used for cutting out the interval data with the time 0 as a reference position, but the reference position may be adjustable. The positions of the sliding windows S1 to Si may be adjustable. In this case, the position of the sliding window is adjusted by using the sliding window width Sw and the amount of adjusted position ew stored in the analysis condition storage unit 210.

The data generation unit 134 generates, for the division data created by the data division unit 132, the combination data that is a text in a predetermined format indicating the change trend of the division data. When the division data is the numerical data, the data generation unit 134 converts the division data into a text indicating an increased or decreased value from a start point value to an end point value. The data generation unit 134 generates the combination data including the converted text. For example, when the division data is the data of the servo motor temperature and the value increases by 5° C. from the start point to the end point of the interval, the data generation unit 134 generates the combination data "servo motor temperature (+5° C.)" from the division data. For example, when the division data is the data of the spindle motor temperature and the value decreases by 8° C. from the start point to the end point of the interval, the data generation unit 134 generates the combination data "spindle motor temperature (−8° C.)" from the division data.

When the division data is data other than the numerical data, the data generation unit 134 converts the division data into a text indicating a flow of a change in a state of the division data. The data generation unit 134 generates the combination data including the converted text. For example, when the division data is the data of the cutting feed signal and does not change with the value of ON in the interval, the data generation unit 134 generates the combination data "cutting feed signal ON" from the division data. For example, when the division data is the data of the single block confirmation signal and changes from the value of OFF to the value of ON in the interval and then changes from the value of ON to the value of OFF, the data generation unit 134 generates the combination data "single block confirmation signal OFF->ON->OFF" from the division data.

The data analysis unit 140 is realized by the CPU 11 executing the system program read from the ROM 12 and by the CPU 11 mainly performing the arithmetic processing using the RAM 13 and the nonvolatile memory 14. The data analysis unit 140 performs known association analysis based on the combination data stored in the combination data storage unit 220. The association analysis is an analysis method of finding a predetermined pattern (correlation rule) from a set of data. For example, in the association analysis, a correlation rule that there is a correlation between "servo motor temperature increases" and "spindle motor temperature increases" is found. Since the data acquired by the data acquisition unit 100 includes the time-series data, it is difficult to apply a general association analysis to this data. However, in the analyzer 1 according to the present invention, the combination data which is the text indicating the data type and the change trend of the data is generated when the preprocessing of the preprocessing unit 130 is performed. Thus, a correlation between a change of the numerical data and a change in the state of the signal value for example can be analyzed by applying the method of the association analysis to this combination data. When the association analysis is performed, the data analysis unit 140 regards the combination data generated based on the data detected at the same time as (co-occurrence) combination data simultaneously occurred. The details of the association analysis have been sufficiently known before the present application is filed, and thus, the description thereof is omitted in the present specification.

The data analysis unit 140 may perform the association analysis on the combination data as it is, or may also perform the association analysis after a plurality of pieces of combination data is regarded as being equal based on a predetermined condition, for example. In this case, the data analysis unit 140 may regard the plurality of pieces of combination data as being equal based on an equivalence condition stored in the analysis condition storage unit 210. For example, when an equivalence condition that the temperature which is the numerical data is rounded down to an integer is set as the equivalence condition, the data analysis unit 140 performs the association analysis by regarding the pieces of combination data "servomotor temperature: +5.2° C." and "servomotor temperature: +5.8° C." as being equal to "servo motor temperature: +5.0° C.". For example, when the single block confirmation signal which is data other than the numerical data has three or more states, an equivalence condition that the state change is regarded as being equal to "other" may be set as the equivalence condition. In this case, the data analysis unit 140 performs the association analysis by regarding the data of the single block confirmation signal having three or more states such as the combination data "single block confirmation signal: OFF->ON->OFF" and the combination data "single block confirmation signal: ON->OFF->ON" as being equal to "single block confirmation signal: other". For the equivalence condition, a range in which the pieces of combination data are regarded as being equal may be determined by the operator based on the characteristics of the data and the like so as to have an appropriate value. For the equivalence condition, a range in which the pieces of data are regarded as being equal may be determined based on a range of the pieces of the data such as X % of a difference between a maximum value and a minimum value of the data.

The data analysis unit 140 may analyze the combination data by other analysis methods, in addition to the association analysis, which are difficult to apply to the time-series data but are applicable to the data such as the text. For example, a known analysis method for analyzing an event such as basket analysis, factor analysis, or ABC analysis may be performed.

The analyzer 1 having the above-described configuration according to the present embodiment can analyze a relationship between various kinds of time-series data acquired from the industrial machine by a known analysis method. Thus, it becomes easier to utilize the data. The relationship between pieces of data obtained by the association analysis performed by the analyzer 1 according to the present embodiment can be utilized for various purposes.

For example, the relationship between the pieces of data can be utilized for stopping the acquisition of unnecessary data. When it is found as a result of the analysis that values of two or more pieces of data are almost equal or when it is determined that the signal is turned on in a certain state, these pieces of data can be regarded as duplicate data. Thus, it is possible to examine the stop of the acquisition of any data. Accordingly, it is possible to examine a decrease in a load of a network used as a data collection device or a data collection path and a decrease in a capacity of a database which is a collection destination of data.

The relationship between the pieces of data can be also utilized for complementing when data is missing. When a relationship between two or more pieces of data is determined as a result of the analysis, even if one piece of data is missing and cannot be collected, the relationship can be complemented with a value predicted by using a value of the other data related to this data.

The relationship between the pieces of data may be utilized for improving the quality of machining. When a relationship between a machining result (non-defective product or defective product) and data collected in the case of machining is determined as a result of the analysis, it is possible to prevent a defective product from being produced by specifying a cause of a defect. The machining can be stopped when a sign that the defective product is to be produced is detected from the data collected while the machine is being operated.

The relationship between the pieces of data can also be utilized for detecting an abnormality. For example, when a relationship of "as the servo temperature increases by 5 degrees, the spindle temperature also increases by 5 degrees" is determined as a result of the analysis, it is possible to determine that an abnormality occurs if the spindle temperature does not increase when the servo temperature increases by 5 degrees.

The relationships between the pieces of data can be utilized for finding a sign of a failure or an alarm. When a relationship between values of the signals in a normal operation is determined as a result of the analysis, for example, and the relationship between the values of the signals is different from that in the normal operation before the alarm occurs, it is possible to determine that this relationship is the sign of the failure or the alarm.

The relationship between the signals is obtained as a graph by performing network analysis on the relationship between the pieces of data, and thus, it is possible to grasp the relationship between all the signals. By doing so, it is possible to visually grasp the relationship between all the signals which cannot be found in the association analysis alone. Using the knowledge of the relationship obtained by grasping the relationship between all the signals enables easy extraction of a feature value of the data to be used in, for example, machine learning. It is possible to expect that other utilization methods are easily implemented by visually grasping the relationship between all the signals.

Figure 6:
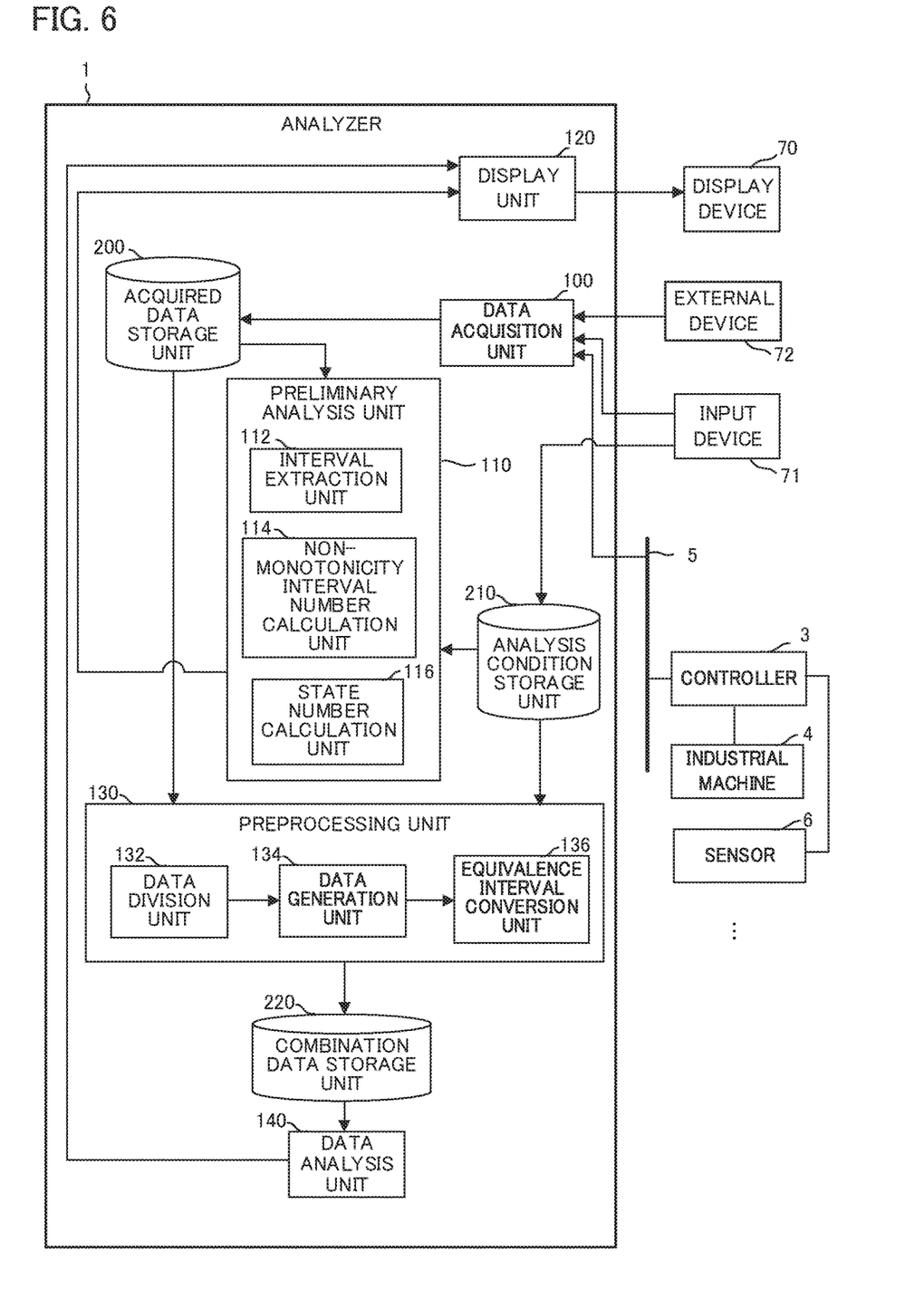
FIG. 6 is a schematic functional block diagram of an analyzer according to a second embodiment.

FIG. 6 is a schematic block diagram illustrating functions of the analyzer 1 according to a second embodiment of the present invention. The functions of the analyzer 1 according to the present embodiment are realized by the CPU 11 of the analyzer 1 illustrated in FIG. 1 executing the system program and controlling operations of the units of the analyzer 1.

The analyzer 1 according to the present embodiment is different from the analyzer 1 according to the first embodiment in that the preprocessing unit 130 includes an equivalence interval conversion unit 136.

The equivalence interval conversion unit 136 classifies the combination data generated by the data generation unit 134 into a set regarded to be equal based on the equivalence condition stored in the analysis condition storage unit 210, and stores the classified combination data in the combination data storage unit 220. The classified combination data is analyzed by the data analysis unit 140.

Figure 7:
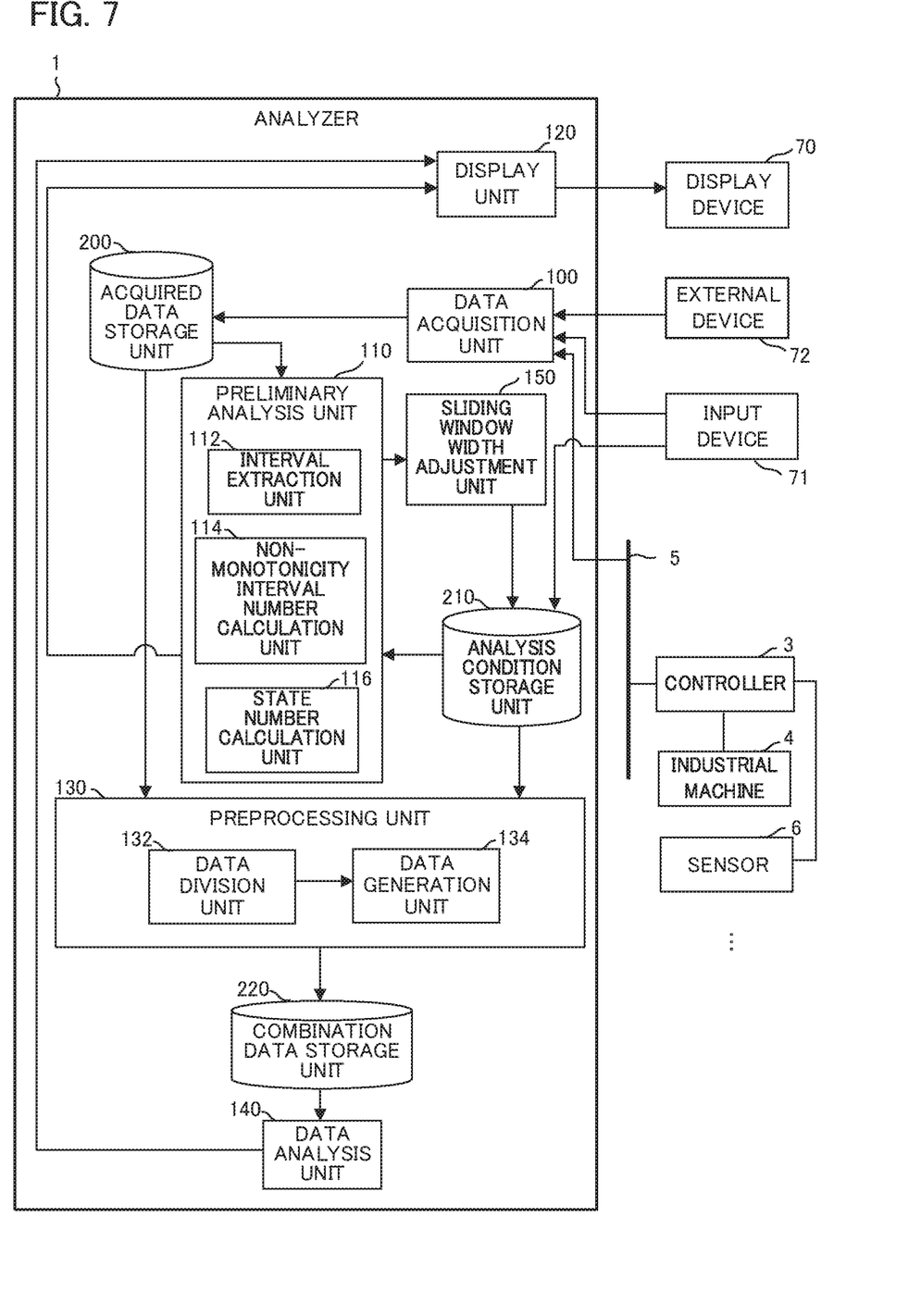
FIG. 7 is a schematic functional block diagram of an analyzer according to a third embodiment.

FIG. 7 is a schematic block diagram illustrating functions of the analyzer 1 according to a third embodiment of the present invention. The functions of the analyzer 1 according to the present embodiment are realized by the CPU 11 of the analyzer 1 illustrated in FIG. 1 executing the system program and controlling operations of the units of the analyzer 1.

The analyzer 1 of the present embodiment is different from the analyzer 1 according to the first embodiment in that a sliding window width adjustment unit 150 is provided.

The sliding window width adjustment unit 150 adjusts the sliding window width Sw based on a predetermined rule, and searches for the sliding window width Sw with which the number of pieces of interval data indicating non-monotonicity obtained by the non-monotonicity interval number calculation unit 114 and the number of pieces of interval data for each number of states obtained by the state number calculation unit 116 are valid. For example, the sliding window width adjustment unit 150 sets a sliding window width Sw−j×dw to a sliding window width Sw+j×dw increased and decreased by a predetermined step with a predetermined adjustment amount dw with the sliding window width Sw set to the analysis condition storage unit 210 by the operator as a reference. The sliding window width adjustment unit 150 may search for the sliding window width satisfying a predetermined validity condition by comparing the number of pieces of interval data indicating non-monotonicity obtained by the non-monotonicity interval number calculation unit 114 with the number of pieces of interval data for each number of states obtained by the state number calculation unit 116 at the time when each sliding window width is set. The sliding window width adjustment unit 150 shifts a division position of the time-series data using the sliding window by a predetermined step with a predetermined adjustment amount ewd. The sliding window width adjustment unit 150 may search for the amount of adjusted sliding window satisfying a predetermined validity condition by comparing the number of pieces of interval data indicating non-monotonicity obtained by the non-monotonicity interval number calculation unit 114 with the number of pieces of interval data for each number of states obtained by the state number calculation unit 116 at the time when the position of each sliding window is set.

The analyzer 1 according to the present embodiment can automatically obtain a better sliding window width and the amount of adjusted position of the sliding window to some extent. Thus, it is possible to reduce a labor related to an examination work of the sliding window width or the amount of adjusted position of the sliding window by the operator to some extent.

Although the embodiments of the present invention have been described above, the present invention is not limited to the examples of the above-described embodiments, and can be implemented in various aspects by appropriately changing the embodiments.

The invention claimed is:

1. An analyzer that analyzes a relationship between a plurality of pieces of data including time-series data acquired during operation of an industrial machine, the analyzer comprising:
a processor configured to:
extract interval data obtained by cutting out the time-series data included in the acquired within a predetermined sliding window width, wherein the sliding window width is set as a value by an operator, and analyze a change trend of the extracted interval data;
divide the acquired data into pieces of division data with the sliding window width set by the operator;
generate combination data including a text of information indicating a change trend in the division data; and
analyze the combination data to determine a pattern of correlation in the time-series data to provide the relationship between the plurality of pieces of data, wherein the relationship is used to detect an occurrence of an event in components of the industrial machine, and wherein a result of the relationship is output to a controller for adjusting operation of the industrial machine based on the result of the relationship.

2. The analyzer according to claim 1,
wherein the processor is further configured to obtain a number of pieces of interval data in which a change in a numerical value indicates non-monotonicity among the pieces of interval data which is numerical data.

3. The analyzer according to claim 1,
wherein the processor is further configured to calculate a number of states of each piece of interval data for the interval data other than the numerical data, and obtain the number of pieces of interval data for each calculated number of states.

4. The analyzer according to claim 1,
wherein the processor is further configured to generate the combination data including a text indicating an increased or decreased value from a start point value to an end point value of the division data based on the division data which is the numerical data.

5. The analyzer according to claim 1,
wherein the processor is further configured to generate the combination data including a text indicating a flow of a change of a state of the division data based on the division data other than the numerical data.

6. An analysis method of analyzing a relationship between a plurality of pieces of data including time-series data acquired during operation of an industrial machine, the method comprising:
extracting interval data obtained by cutting out the time-series data included in the acquired time-series data within a predetermined sliding window width, wherein the sliding window width is set as a value by an operator, and analyzing change trend of the extracted interval data;
dividing the acquired data into pieces of division data with the sliding window width set by the operator;
generating combination data including a text of information indicating a change trend in the division data;
analyzing the combination data to determine a pattern of correlation in the time-series data to provide the relationship between the plurality of pieces of data; and
outputting a result of the relationship to a controller for adjusting operation of the industrial machine based on the result of the relationship.

* * * * *